United States Patent [19]

Loqvist

[11] 4,112,564
[45] Sep. 12, 1978

[54] METHOD OF MAKING A COMPOSITE ROLLER

[75] Inventor: Kaj-Ragnar Loqvist, Fagersta, Sweden

[73] Assignee: Seco Tools Aktiebolag, Fagersta, Sweden

[21] Appl. No.: 787,213

[22] Filed: Apr. 13, 1977

Related U.S. Application Data

[63] Continuation-in-part of Ser. No. 654,415, Feb. 2, 1976, abandoned.

[30] Foreign Application Priority Data

Jan. 31, 1975 [SE] Sweden ............................ 7501066

[51] Int. Cl.² .................... B21D 53/12; B21B 31/08; B60B 7/04; B60B 11/04
[52] U.S. Cl. .................. 29/148.4 D; 29/446; 29/460; 29/463; 29/125; 219/9.5; 228/243
[58] Field of Search ............... 29/447, 463, 125, 446, 29/132, 460, 148.4 D; 219/9.5; 228/243

[56] References Cited

U.S. PATENT DOCUMENTS

| 2,279,854 | 4/1942 | Whitney | 219/9.5 X |
| 2,342,159 | 2/1944 | Moran | 29/125 |
| 2,484,613 | 10/1949 | Detuno | 219/9.5 X |
| 2,991,899 | 7/1961 | Montalbano | 29/463 UX |
| 3,283,112 | 11/1966 | Roehrs | 219/9.5 |
| 3,787,942 | 1/1974 | Bindernagel | 29/125 |
| 3,787,943 | 1/1974 | Loqvist | 29/125 |
| 3,842,471 | 10/1974 | Palhall et al. | 29/132 X |

Primary Examiner—Charlie T. Moon
Attorney, Agent, or Firm—Burns, Doane, Swecker & Mathis

[57] ABSTRACT

The composite roller of the invention comprises a ring of near-resistant material encircling a holding member which latter has an inner portion and two radial flanges between which said ring is axially fixed. Said flanges have grooves at those portions which abut lateral surfaces of said ring. A continuously U-shaped intermediate space is provided axially and radially between ring and holding member.

5 Claims, 2 Drawing Figures

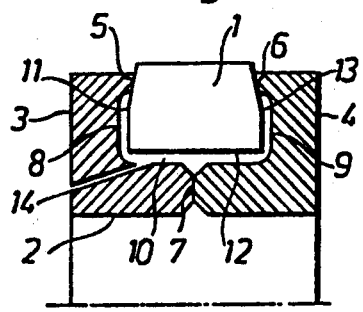

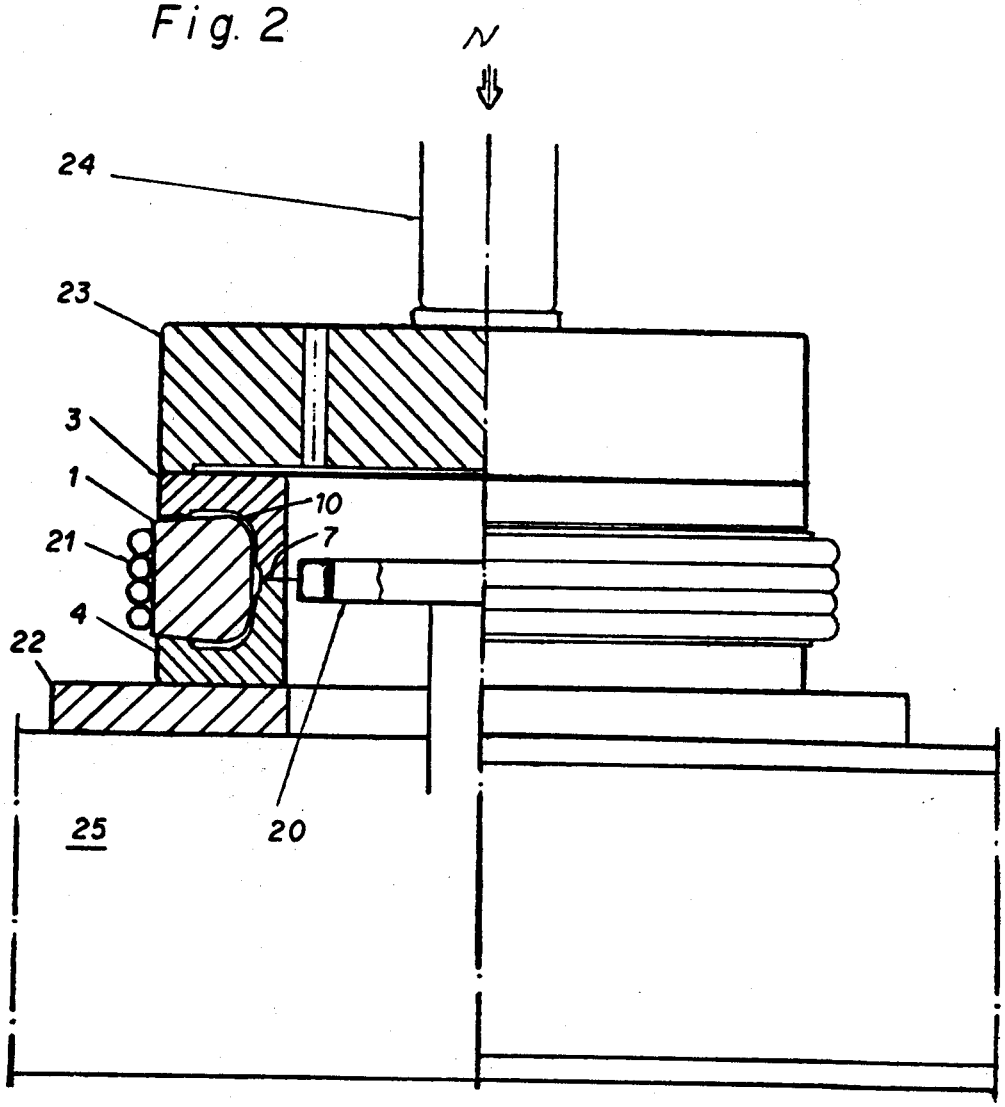

METHOD OF MAKING A COMPOSITE ROLLER

This case is a continuation-in-part of Ser. No. 654,415 filed Feb. 2, 1976, now abandoned.

The present invention relates to a composite roller comprising a ring of wear-resistant material, such as hard metal, having around it a holding member, said member comprising an inner portion and two radial flanges connected therewith.

Rollers for wire mills and other mills usually are made as composite rollers. This is a consequence of using the hard and wear-resistant hard metal as rolling surface, — the used amount of which, however, must be as low as possible for economical reasons. In view thereof the roller usually is composed of a ring connected to a holding member by a suitable joint means, said holding member usually being a steel member.

Various composite rollers previously have been known. One prior embodiment comprised a hard metal ring mechanically clamped against opposed radial flanges of a holding member by a screw joint. With such structure there is certainly used a low amount of hard metal. On the other hand, there are required cost-consuming grinding operations so as to present perfectly flat opposed surfaces on the ring and the flanges. There also is required a rather cost-consuming working of the holder member in order to reach appropriate or acceptable tolerances.

In another prior embodiment the hard metal ring was mechanically clamped to radial flanges on an interior holding member, but instead of using a screw joint said flanges were connected to the interior holder and against the hard metal ring by shrinking. This certainly resulted in an appropriate prestressed condition axially, but there was required some grinding operations in the opposed clamping surfaces as related above.

With a prior composite roller comprising a hard metal ring cast around a holding member there is less need of grinding while reaching a prestressed condition axially but instead there are considerable costs connected with the casting moulds used to an extent that makes it necessary to find less cost-consuming manufacturing operations.

An object of the invention is to eliminate the disadvantages of prior known assemblies of this kind and, simultaneously, to enable maintaining in o structure all those advantages that were achieved with each of said prior assemblies. To this end there is provided a composite roller of the aforementioned kind which is mainly characterized in that the hard metal ring is received around the holding member with intermediate space axially and radially, said space being continuously U-shaped. Other characteristic features of the invention will be made apparent from the appended claims.

The invention will now be described with reference to the accompanying drawings, in which FIG. 1 is a cross-sectional view of an embodiment of the invention; and FIG. 2 is a vertical view, partly in section, representing the welding procedure by which the holding member, — shown in FIG. 1, — is produced.

In the drawing the reference number 1 indicates a ring of hard and wear-resistant material, such as hard metal (i.e., sintered carbide), having around it a holding member comprising an inner portion 2 and two radial flanges 3 and 4 connected therewith. The holder thus can be said to be composed of two basically L-shaped portions, the hard metal ring 1 being secured axially therebetween by locating flanges 3 and 4 in abutment with contact surfaces 5 and 6 provided laterally of said ring. The lateral surfaces of said ring 1 are suitably partly converging conically in radially outwards direction, and the contact surfaces 5 and 6 are simultaneously given a matching conical shape in relation to that of the roller shaft. Because of this mounting it is possible to give the hard metal ring compressive stresses in the axial as well as radial directions.

Both of the L-shaped portions of the holding members are pressed against each other laterally and butt-welded at contact surface 7. There is achieved an axially prestressed condition partly because of heating and cooling in connection with the welding that results in shrinking axially and radially, and partly because of the load which must be applied axially to the flanges 3 and 4 in connection therewith. Further, the time of welding may be extended to such an extent that said flanges 3 and 4 are at an increased temperature wherewith the differences in thermal expansions between the flange material, — usually steel, — and the hard metal ring will result in a correspondingly increased axial pressure at contact surfaces 5 and 6.

Alternatively, it is possible to have the flanges preheated in a furnace to an increased temperature which enables achievement of a similar variation of the axial pressure at contact surfaces 5 and 6.

Flanges 3 and 4 are provided with grooves 8 and 9 at those portions which are located in abutment with the lateral surfaces of the hard metal ring. These grooves are provided for the purpose of achieving an intermediate space 10 axially and radially between said ring 1 and said flanges which space is continuously U-shaped. As a consequence thereof it is no longer necessary to have the surfaces indicated 11, 12 and 13 on said ring subjected to cost-consuming grinding operations, nor is it necessary similarly to grind those surfaces of said ring which are located in abutment with the flanges 3 and 4. It is merely important to reach at surfaces 5 and 6 a cone angle that is maintained with a certain degree of exactness relative to the roller shaft. A hole 14 is bored in the inner portion 2 of the holdimg member for injecting, for instance, a reinforced apoxibase thermosetting resin, metal or any other suitable support material. This results in obtaining a hard metal ring of increased radial stiffness.

The procedure by which the holding member of the composite roller of the invention is produced is illustrated in FIG. 2.

As in FIG. 1 of the specification, reference number 1 indicates the wear ring 3 and 4 indicate the flanges and 7 their contact surface, the intermediate U-space being indicated 10. A high frequency electric induction coil 20 is provided interiorly of said flanges 3 and 4, and a coil 21 for the circulation of warm or cold medium is provided exteriorly of the wear ring 1.

The composite structure is placed on a press table 22 and a press plate 23 is provided to exert pressure on said structure from the opposite side thereof by means of a plunger 24. The whole equipment is placed on a suitable bottom support 25.

The welding procedure is initiated by placing a suitable fluxing material on contact surface 7. Then electric effect is given to the coil 20 and cooling medium starts circulation in coil 21. The result thereof is that the whole composite structure expands upwardly due to the heating thereof and this expansion (some millimeters) is possible because no pressure has yet been produced by plunger 24 (except its own gravity). When a suitable temperature has been reached (about 1300° C.) a force N is caused to act downwards via the plunger 24 so as to press the flanges back to their starting position and at this stage the electric effect is also switched off from the coil 20. The circulation of cooling medium is still maintained for some time in coil 21. Finally, a suitable supporting material is introduced into the U-space 10, which completes the whole procedure of manufacture. The welding procedure takes some 10 minutes and the subsequent cooling (after switching off coil 20) takes additionally some 20–30 minutes, which means that a roll structure is produced in half an hour, which is very rapid compared with prior technique.

It is not absolutely necessary to apply any medium at all to circulate exteriorly of the wear ring. This depends on the degree of prestressed condition that is to be reached. Alternatively, some warm medium (oil) could be caused to circulate in coil 20 during and after the welding procedure. These alternative measures give the opportunity of reaching and regulating a suitable combination of compressive stresses applied radially and axially to the composite structure which is of advantage.

It should also be pointed out that the two flanges 3 and 4 preferably are identically shaped, but it is possible to make them somewhat different which simply means that contact surface 7 is displaced some distance upwards or downwards in the Figure filed herein.

I claim:

1. A method of making a roller for hot and cold rolling comprising the steps of:

providing a wear ring (1) of hard metal having outwardly convergent conical end parts, the cross-section of which decreases radially outwardly: providing a supporting structure composed of two supporting rings (3,4) L-shaped in cross-section; positioning the wear ring between said supporting rings with its conical outer parts in abutment with corresponding conical abutment surfaces (5,6) on said supporting rings;

said positioning being such as to bring said support rings into abutment at end surfaces (7) of opposed leg portions of said support rings, while leaving a closed U-space (10) between the wear ring and said support rings;

positioning the whole composite structure thus produced on a bottom support (25);

providing a high frequency electric induction coil (20) interiorly of said composite structure which is caused to effect heating and welding at surfaces (7) for a predetermined time period, thus causing expansion of said composite structure;

applying pressure on said composite structure against said bottom support (25) so as to bring said support rings back to their position before expansion; and switching off the induction coil, thus cooling the composite structure whereby said support rings shrink against the wear ring and exert compressive forces thereto.

2. The method of claim 1 wherein, during welding, coolant is caused to circulate in a coil (21) provided exteriorly of the wear ring (1).

3. The method of claim 2, wherein said coolant circulating step comprises circulating coolant in coil (21) exteriorly of said wear ring (1) subsequent to the welding procedure for a predetermined period of time.

4. The method of claim 1, including the step of filling said U-space (10) with a suitable supporting material.

5. The method of claim 1, wherein said two support rings (3,4) are identical in shape and are welded together at contact surfaces (7).

* * * * *